(12) United States Patent
Parush-Shear-Yashuv et al.

(10) Patent No.: US 7,958,398 B2
(45) Date of Patent: Jun. 7, 2011

(54) REFERENCE STATE INFORMATION GENERATION

(75) Inventors: Naama Parush-Shear-Yashuv, Neve-Daniel (IL); Dan Pelleg, Haifa (IL); Lisa F. Spainhower, Highland, NY (US); Paula Kim Ta-Shma, Tel Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/173,840

(22) Filed: Jul. 16, 2008

(65) Prior Publication Data

US 2010/0017653 A1    Jan. 21, 2010

(51) Int. Cl.
*G06F 11/00* (2006.01)
(52) U.S. Cl. .......................................... 714/36; 711/118
(58) Field of Classification Search ................ 714/36
See application file for complete search history.

(56) References Cited

U.S. PATENT DOCUMENTS

| | | | | |
|---|---|---|---|---|
| 5,265,240 A * | 11/1993 | Galbraith et al. | ............... | 710/15 |
| 5,386,552 A * | 1/1995 | Garney | ............... | 714/10 |
| 5,634,096 A * | 5/1997 | Baylor et al. | ............... | 714/6 |
| 5,905,855 A * | 5/1999 | Klaiber et al. | ............... | 714/31 |
| 6,795,966 B1 * | 9/2004 | Lim et al. | ............... | 718/1 |
| 6,920,533 B2 * | 7/2005 | Coulson et al. | ............... | 711/145 |
| 7,043,629 B1 * | 5/2006 | Taraz | ............... | 713/1 |
| 7,200,665 B2 * | 4/2007 | Eshghi et al. | ............... | 709/227 |
| 7,275,135 B2 * | 9/2007 | Coulson | ............... | 711/143 |
| 7,287,153 B1 * | 10/2007 | Hamersley | ............... | 713/1 |
| 7,299,346 B1 * | 11/2007 | Hollis | ............... | 713/2 |
| 7,533,178 B2 * | 5/2009 | Henniger | ............... | 709/227 |
| 2003/0005223 A1 * | 1/2003 | Coulson et al. | ............... | 711/118 |
| 2003/0074395 A1 * | 4/2003 | Eshghi et al. | ............... | 709/203 |
| 2007/0038850 A1 * | 2/2007 | Matthews et al. | ............... | 713/1 |

OTHER PUBLICATIONS

Andrea Carol Arpaci Dusseau et al., "Semantically-smart disk systems: past, present, and future", ACM SIGMETRICS Performance Evaluation Review, vol. 33 , Issue 4 (Mar. 2006).

Stephen T. Jones et al., "Antfarm: Tracking Processes in a Virtual Machine Environment", 2006 USENIX Annual Technical Conference, pp. 1-14 of the *Proceedings*.

* cited by examiner

*Primary Examiner* — Scott T Baderman
*Assistant Examiner* — Kamini Patel

(57) ABSTRACT

A method for generating reference state information, the method includes: comparing between at least one sequence of block identifiers that are accessed during a test period and at least one corresponding reference sequence of block identifiers to provide a comparison result; determining whether to generate reference state information in response to the comparison result; and generating reference state information if determining to generate the reference state information.

20 Claims, 2 Drawing Sheets

REFERENCE STATE INFORMATION GENERATION

FIELD OF THE INVENTION

The present invention relates to systems, methods and computer program products for generating reference state information.

BACKGROUND OF THE INVENTION

Virtual machines isolate an operating system from the computer platform that is used to execute the operating system. Operating systems running inside virtual machines can be executed by different computer platforms.

A single computer platform can support multiple virtual machines concurrently. Such a computer platform is commonly referred to as a logically partitioned platform. Each operating system or instance of an operating system is assigned a non-overlapping subset of the computer platform.

Typically, the multiple virtual machines are controlled by a hypervisor. The hypervisor can manage and enforce partition protection boundaries.

The state of a virtual machine can be stored (and restored) by using virtual machine check-pointing. The state of a virtual machine can be at least partially temporarily stored within various volatile memory units such as internal registers of the computer platform. The act of storing the state of the virtual machine is referred to as check-pointing. Accordingly, a snapshot of the state is stored in a non-volatile memory unit and can be retrieved when needed.

Restarting ("rebooting") of computer systems is a procedure that can be executed in order to overcome acute failures or for other maintenance reasons. This procedure may normally take from several to tens of seconds to complete.

There is a need to speed up the booting sequence.

SUMMARY

A method for generating reference state information, the method includes: comparing between at least one sequence of block identifiers that are accessed during a test period and at least one corresponding reference sequence of block identifiers to provide a comparison result; determining whether to generate reference state information in response to the comparison result; and upon determination to generate the reference state information, generating reference state information.

A computer program product is provided. It includes a computer usable medium including a computer readable program, wherein the computer readable program when executed on a computer causes the computer to: compare between at least one sequence of block identifiers that are accessed during a test period and at least one corresponding reference sequence of block identifiers to provide a comparison result; determine whether to generate reference state information in response to the comparison result; and generate reference state information upon determination to generate the reference state information.

Conveniently, the computer program product causes the computer to determine to generate the reference state information if the comparison result indicates that a boot sequence terminated.

Conveniently, the computer program product causes the computer to compare between multiple sequences of block identifiers that were accessed occurred during the test period and multiple corresponding reference sequences of block identifiers that are associated with different phases of a boot sequence; and determining to generate the reference state information if the comparison result indicates that the different phases of the boot sequence were completed.

Conveniently, the comparing is responsive to different variability levels of the different phases of the boot sequence.

Conveniently, the computer program product causes the computer to receive from a storage sub system information indicative of the sequence of block identifiers that are accessed during a test period.

Conveniently, the computer program product causes the computer to initiate an update of at least one reference sequence of block identifiers if failing, within a predefined period, to find a predefined relationship between at least one sequence of block identifiers that are accessed during a test period and at least one corresponding reference sequence of block identifiers.

Conveniently, the computer program product causes the computer to generate a request to re-start a system if failing, within a predefined period, to find a predefined relationship between at least one sequence of block identifiers that are accessed during a test period and at least one corresponding reference sequence of block identifiers.

Conveniently, the computer program product causes the computer to generate the at least one reference sequence of block identifiers.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
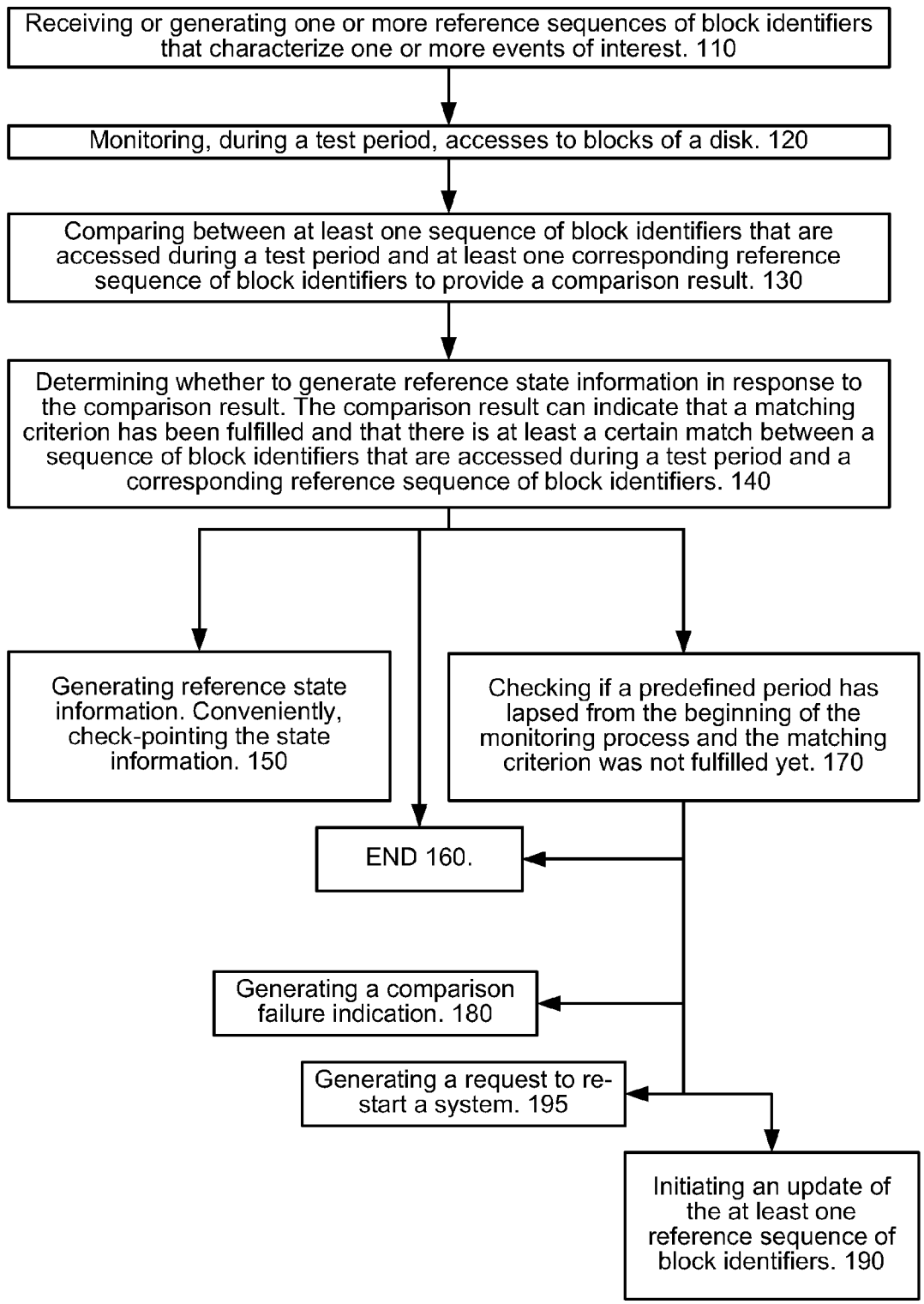
FIG. 1 illustrates a method according to an embodiment of the invention.

A method, a system, and a computer program product are provided. They facilitate generating reference state information. This reference state information can be later loaded and used in various scenarios, including but not limited to, future booting sequences.

The reference state information can include reference state information of a virtual machine. It can include the content of buffers, queues and the like.

By loading the reference state information during future booting sequences, these future booting sequences can be shortened.

It is noted that reference state information can be used after a system (also referred to as guest, a host or a computer) is powered up, after a system exits a low power mode, after a hibernation period ends, and the like. The reference state information can be used after a cold start as well as after a hot start.

It has been shown that reference state information should be taken after a booting sequence ends and in particular immediately after a booting sequence ends. The occurrence of the booting sequence and especially the termination of the booting sequence can be detected by monitoring the blocks (physical, logical or virtual) of a disk that were accessed during a test period and looking for one or more reference sequences of block identifiers that characterize a booting sequence.

For simplicity of explanation it is assumed that the blocks are retrieved from a single disk. The invention can be applied mutatis mutandis to a retrieval of blocks from more than a single disk, and additionally or alternatively, to a retrieval of blocks from a storage component that differs then a disk.

The mentioned above monitoring can be executed without altering existing booting sequence code, has a low overhead and requires no cooperation (or even awareness) from the system that executed the booting sequence. In particular, there is no need for a manual definition of the availability of the system (for example, which network ports need to be open before the machine is declared "operational") to determine when the booting sequence ends and the system if "operational".

Conveniently, by providing the appropriate reference sequence of block identifiers, events of interest other than booting sequences can be detected. For example, a reference sequence of block identifiers that characterizes a behavior of a very loaded memory unit can be used to detect such a load. Yet for another example, a reference sequence of block identifiers that characterizes abnormal terminations can be used to detect such an abnormal termination.

In a virtualized system the monitoring can be executed by a hypervisor, but this is not necessarily so. In a non-virtualized system the monitoring can be executed by a monitor that is included in a disk drive, a disk controller, or in a storage sub-system.

A hypervisor can be used to track disk accesses of a virtualized system. Block identifiers such as indices of accessed blocks are stored. The monitoring can require minor modifications to an existing hypervisor. For example, in Xen, either the blktap mechanism or QEMU device model may be easily modified to produce the desired information.

Conveniently, an event of interest can be expected to be detected during a predefined period. If the event of interest is not detected during the predefined period then at least one of the following stages can occur: (i) determining that the event of interest has been changed (for example, determining that the boot sequence changed); (ii) triggering a generation of a new reference sequence of block identifiers; (iii) determining that the event of interest has failed (for example, a boot sequence was not successfully completed); (iv) generating a request (that can be aimed to a user) to change the state of a system; or (v) generating a request to retrieve a previously stored reference state information. For example, if a boot sequence termination was not detected during a predefined period then a user can be requested to perform a cold start.

FIG. 1 illustrates method 100 for generating reference state information, according to an embodiment of the invention.

Method 100 starts by stage 110 of receiving or generating one or more reference sequences of block identifiers that characterize one or more events of interest. Each sequence includes block identifiers of blocks (virtual or physical) of a disk that are expected to be accessed during an occurrence of an event of interest.

These events of interest can include a booting sequence phase, a booting sequence, an abnormal termination, a high load imposed upon a resource such as a memory unit or a processor, and the like. A booting sequence can include multiple phases and each phase can be characterized by its own reference sequence of block identifiers.

The generating of a reference sequences of block identifiers of a certain event of interest can include monitoring the blocks that were accessed during one or more (usually multiple) occurrences of the certain event of interest to obtain multiple results and statistically analyzing these results. The analysis aims to find the sequences of blocks that characterize the event of interest.

Stage 110 is followed by stage 120 of monitoring, during a test period, accesses to blocks of a disk. It is noted that stage 120 can include monitoring access to more than a single disk and even to storage components that differ from disks.

The test period can be any period during which events of interest should be detected. The duration (as well as other timing parameters such as start time, end time) of the test period can be determined in advance, usually in response to an expected behavior of the monitored system. For example, when monitoring a completion of a booting sequence time limitations can be imposed on the duration of the test period, especially in view of an expected duration of a boot sequence.

Stage 120 is followed by stage 130 of comparing at least one sequence of block identifiers that are accessed during a test period with at least one corresponding reference sequence of block identifiers to provide a comparison result. Conveniently, the comparison is responsive to the order of the block identifiers within the sequence.

Conveniently, a boot sequence includes multiple phases. Each booting sequence phase can be characterized by its own reference sequence of block identifiers. Different phases can also be characterized by different variability levels. A variability level indicates expected differences between sequences of blocks accessed during different instances of the same boot sequence phase. Other statistical measures, not just variability, could also be used. For example, the rate of requests, the ratio between the numbers of read and write requests, and so on.

The detection of an occurrence of a boot sequence and especially of a termination of a boot sequence can include detecting an occurrence of boot sequence phases, one after the other. It is noted that within each phase the order of blocks can be irrelevant.

It is noted that in cases where a booting sequence phase is characterized by a very high variability then this phase can be ignored during the detection of the entire booting sequence.

Stage 130 is followed by stage 140 of determining whether to generate reference state information in response to the comparison result. The comparison result can indicate that a matching criterion has been fulfilled and that there is at least a certain match between a sequence of block identifiers that are accessed during a test period and a corresponding reference sequence of block identifiers. The matching criterion can be responsive to an expected variability of a sequence of block identifiers that are expected to be accessed during an event of interest.

The matching criterion can be determined in advance. It can indicate the minimal match percentage between sequences, can indicate portions of the sequences that should be characterized by a higher match than that of other portions, and the like. The matching criterion can also indicate whether an order of blocks in a certain portion of the sequence is irrelevant.

A determination to generate reference state information is referred to as a positive answer (of the determination) while a determination not to generate reference state information is referred to as a negative answer.

Conveniently, reference state information is generated if a predefined event of interest was detected or that the event of interest has terminated. For example, the answer is positive if a termination of a booting sequence is detected.

If the answer is positive then stage 140 is followed by stage 150 of generating reference state information. This can involve check-pointing the state information. The state information can be stored in a non-volatile memory unit. It is noted that currently generated reference state information can replace previously generated reference state information, although this is not necessarily so and multiple versions of reference information can be stored at a given point in time, in a non-volatile memory unit. Stage 150 can also include generating an indication that the reference state indication should be generated. This indication can trigger the check-pointing. This indication can be sent to another system or entity (other that the entity that executed method 100).

If the answer is negative then stage 140 can be followed by stage 160 thereby ending method 100.

Stage 140 can also be followed by stage 170 of checking if a predefined period has lapsed from the beginning of the monitoring process and the matching criterion was not fulfilled yet.

If the answer is positive then stage 170 can be followed by stage 160, by stage 180 of generating a comparison failure indication, stage 190 of initiating an update of at least one reference sequence of block identifiers or stage 195 of generating a request to re-start a system.

The following example will illustrate a sample execution of various stages of method 100. When generating the reference sequence of block identifiers only read operations are taken into account. The reference sequence of block identifier was built by monitoring two occurrences of a boot sequence to generate an initial reference sequence of blocks and then updating the reference sequence of block identifier during further occurrences of the booting sequence. The update was stopped when the variability (over time) of the reference sequence of block identifiers was relatively stable (its variability was lower than a predefined threshold). The reference sequence of block identifiers includes block identifiers that appeared in at least 70% of the occurrences of the booting sequence. The end of a booting sequence and hence the end of test period was detected by a sudden increment in block identifier variability. Multiple reference sequences of block identifiers were generated—one per booting sequence phase. The order within each reference sequence was not relevant. The matching criterion mandated that at least a 90% match was obtained for each phase out of two boot sequence phases.

Figure 2:
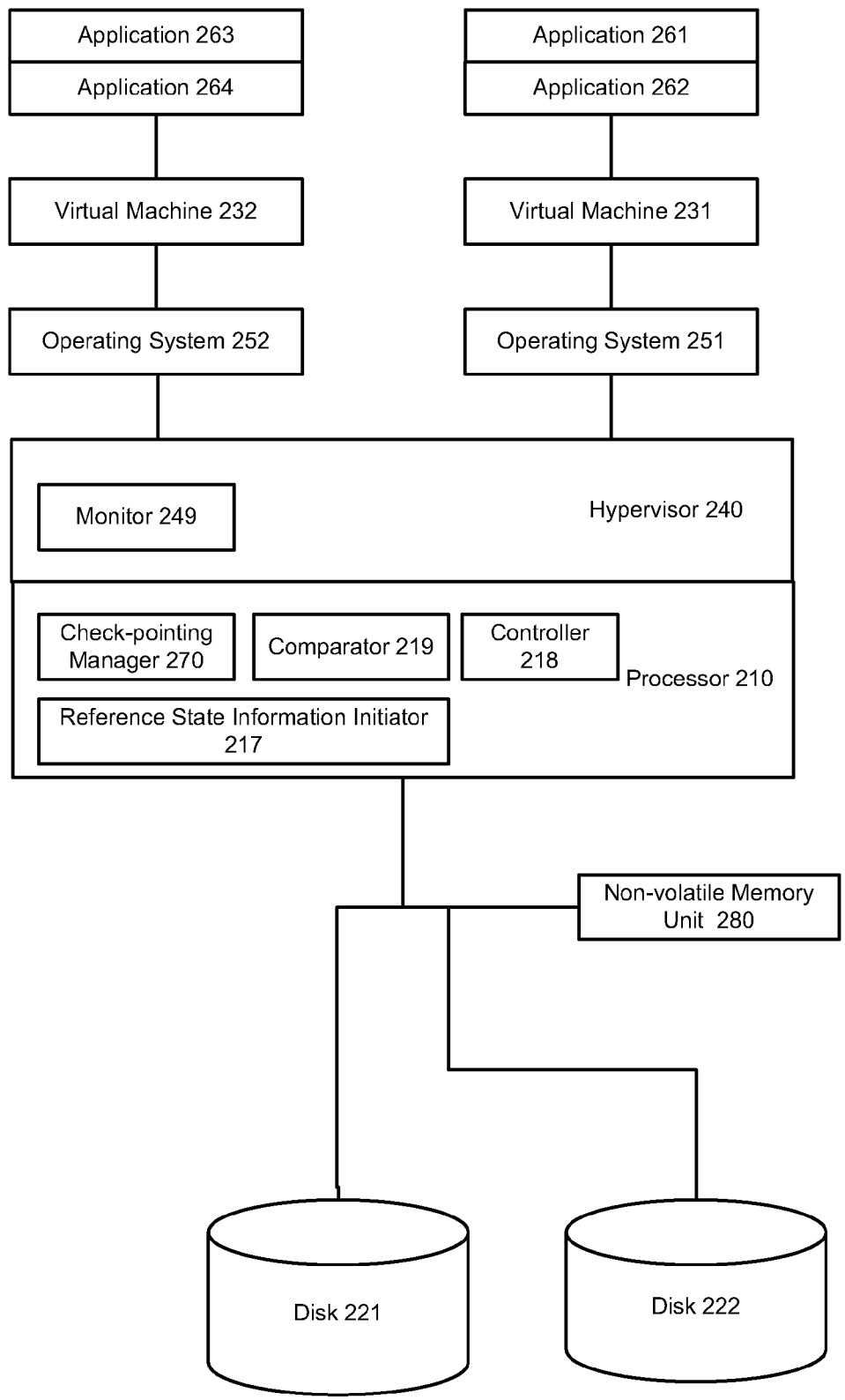
FIG. 2 illustrates a system, according to an embodiment of the invention.

FIG. 2 illustrates system 200 according to an embodiment of the invention.

FIG. 2 illustrates a virtualized system 200 but method 100 can be implemented in non-virtualized systems.

FIG. 2 illustrates both hardware components such as processor 210, disks 221 and 222, and non-volatile memory unit 280. It also illustrates software or firmware components such as hypervisor 240, operating systems 251 and 252, applications 261, 262, 263 and 264 and check-pointing manager 270.

Hypervisor 240 includes monitor 249. Processor 210 includes comparator 219, controller 218 and reference state information initiator 217.

Monitor 249 is adapted to detect at least one sequence of block identifiers that are accessed during a test period.

Comparator 219 is adapted to compare at least one sequence of block identifiers that are accessed during the test period with at least one corresponding reference sequence of block identifiers to provide a comparison result. It monitors accesses to blocks from disk 221 and/or disk 222.

Controller 218 is adapted to determine whether to generate reference state information in response to the comparison result.

Reference state information initiator 217 is adapted to initiate a generation of reference state information if the controller determines to generate the reference state information. It can send a triggering signal to check-pointing manager 270 that generates a snapshot of state information. The state information is stored at non-volatile memory unit 280.

Conveniently, controller 218 can determine to generate the reference state information if the comparison result indicates that a boot sequence terminated.

Conveniently, comparator 219 can compare multiple sequences of block identifiers that were accessed during the test period with multiple corresponding reference sequences of block identifiers that are associated with different phases of a boot sequence; and determine to generate the reference state information if the comparison result indicates that the different phases of the boot sequence were completed.

Conveniently, comparator 219 can perform the mentioned above comparison in response to different variability levels of the different phases of the boot sequence.

Conveniently, comparator 219 can receive, from a storage sub system, information indicative of the sequence of block identifiers that are accessed during a test period.

Conveniently, processor 210 can initiate an update of at least one reference sequence of block identifiers if failing, within a predefined period, to find a predefined relationship between at least one sequence of block identifiers that are accessed during a test period and at least one corresponding reference sequence of block identifiers.

Conveniently, processor 210 can generate a request to re-start system 200 if failing, within a predefined period, to find a predefined relationship between at least one sequence of block identifiers that are accessed during a test period and at least one corresponding reference sequence of block identifiers.

Conveniently, processor 210 can generate at least one reference sequence of block identifiers. It can apply stage 110 of method 100.

Furthermore, the invention can take the form of a computer program product accessible from a computer-usable or computer-readable medium generating program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can store information that can be read by electronic, magnetic, optical, electromagnetic or infrared based techniques, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which generate temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the claims.

We claim:

1. A method for generating reference state information in a virtualized system, wherein the reference state information is utilized to determine when the booting sequence for a computing system ends, the method comprises comprising:
    during the booting stage of a computing system, over which one or more virtual machines are hosted, utilizing a hypervisor running on the computing system to monitor a sequence of block identifiers accessed during the booting stage,
        wherein the monitoring comprises comparing a first sequence of block identifiers that are accessed during a test period with a second sequence of block identifiers to provide a comparison result,
        wherein the second sequence of block identifiers is a reference sequence of block identifiers in which reference state information from a last booting state of the computing system is stored as a point of reference,
        wherein the first sequence of block identifiers comprises state information generated as the result of the booting of the computing system after the last booting state,
    generating reference state information in response to the hypervisor determining that the booting of the computing system has been completed, based on results generated from the hypervisor comparing the first sequence of block identifiers with the second sequence of block identifiers,
    wherein the generated reference state information replaces the reference state information generated during the previous booting process, wherein the reference state information includes state information about virtual machines running on the computing system at a stage immediately after the booting process is completed, as opposed to state information about the virtual machines running on the computing system before the computing system is shutdown.

2. The method according to claim 1 wherein the reference state information stored as a point of reference was stored either:
    (1) after the last booting state was determined to be completed and before the last booting state was modified, after the last booting state was completed, or
    (2) based on monitoring at least two occurrences of a boot sequence to generate an initial reference sequence of block identifiers.

3. The method according to claim 1 comprising comparing between multiple sequences of block identifiers that were accessed occurred during the test period and multiple corresponding reference sequences of block identifiers that are associated with different phases of a boot sequence; and determining to generate the reference state information if the comparison result indicates that the different phases of the boot sequence were completed.

4. The method according to claim 3 wherein the comparing is responsive to different variability levels of the different phases of the boot sequence.

5. The method according to claim 1 comprising detecting, by a hypervisor, at least one sequence of block identifiers that are accessed during the test period.

6. The method according to claim 1 comprising receiving from a storage sub system information indicative of the sequence of block identifiers that are accessed during a test period.

7. The method according to claim 1 comprising initiating an update of the at least one reference sequence of block identifiers if failing, within a predefined period, to find a predefined relationship between the at least one sequence of block identifiers that are accessed during a test period and the at least one corresponding reference sequence of block identifiers.

8. The method according to claim 1 comprising sending an indication that indicates that reference state information should be generated.

9. The method according to claim 1 comprising generating a request to re-start a system if failing, within a predefined period, to find a predefined relationship between the at least one sequence of block identifiers that are accessed during a test period and the at least one corresponding reference sequence of block identifiers.

10. The method according to claim 1 comprising generating the at least one reference sequence of block identifiers.

11. A system for generating reference state information in a virtualized system, wherein the reference state information is utilized to determine when the booting sequence for a computing system ends, the system comprising:
    a monitor to monitor a sequence of block identifiers accessed during a booting stage booting stage of a computing system, over which one or more virtual machines are hosted, utilizing a hypervisor running on the computing system,
    a comparator for comparing a first sequence of block identifiers that are accessed during a test period with a second sequence of block identifiers to provide a comparison result,
        wherein the second sequence of block identifiers is a reference sequence of block identifiers in which reference state information from a last booting state of the computing system is stored as a point of reference,
        wherein the first sequence of block identifiers comprises state information generated as the result of the booting of the computing system after the last booting state,
        wherein the reference state information stored as a point of reference was stored either:
            (1) after the last booting state was determined to be completed and before the last booting state was modified, after the last booting state was completed, or
            (2) based on monitoring at least two occurrences of a boot sequence to generate an initial reference sequence of block identifiers;
    a reference state information initiator, responsive to a controller, the reference state information initiator configured for generating reference state information in response to the hypervisor determining that the booting of the computing system has been completed, based on results generated from the hypervisor comparing the first sequence of block identifiers with the second sequence of block identifiers,
    wherein the generated reference state information replaces the reference state information generated during the previous booting process, wherein the reference state information includes state information about virtual machines running on the computing system at a stage immediately after the booting process is completed, as opposed to state information about the virtual machines running on the computing system before the computing system is shutdown.

12. The system according to claim 11 comprising a processor that hosts a hypervisor, wherein the hypervisor comprises the monitor.

13. A computer program product comprising a non-transient computer usable medium including a computer readable program, wherein the computer readable program when executed on a computer causes the computer to:

during the booting stage of a computing system, over which one or more virtual machines are hosted, utilize a hypervisor running on the computing system to monitor a sequence of block identifiers accessed during the booting stage, wherein the monitoring comprises a first sequence of block identifiers that are accessed during a test period with a second sequence of block identifiers to provide a comparison result, wherein the second sequence of block identifiers is a reference sequence of block identifiers in which reference state information from a last booting state of the computing system is stored as a point of reference, wherein the first sequence of block identifiers comprises state information generated as the result of the booting of the computing system after the last booting state, wherein the reference state information stored as a point of reference was stored either:

(1) after the last booting state was determined to be completed and before the last booting state was modified, after the last booting state was completed, or (2) based on monitoring at least two occurrences of a boot sequence to generate an initial reference sequence of block identifiers;

generate reference state information in response to the hypervisor determining that the booting of the computing system has been completed, based on results generated from the hypervisor comparing the first sequence of block identifiers with the second sequence of block identifiers, wherein the generated reference state information replaces the reference state information generated during the previous booting process, wherein the reference state information includes state information about virtual machines running on the computing system at a stage immediately after the booting process is completed, as opposed to state information about the virtual machines running on the computing system before the computing system is shutdown.

14. The computer program product according to claim 13 that causes the computer to determine to generate the reference state information if the comparison result indicates that a boot sequence terminated.

15. The computer program product according to claim 13 that causes the computer to compare between multiple sequences of block identifiers that were accessed occurred during the test period and multiple corresponding reference sequences of block identifiers that are associated with different phases of a boot sequence; and determining to generate the reference state information if the comparison result indicates that the different phases of the boot sequence were completed.

16. The computer program product according to claim 15 wherein the comparing is responsive to different variability levels of the different phases of the boot sequence.

17. The computer program product according to claim 13 that causes the computer to receive from a storage sub system information indicative of the sequence of block identifiers that are accessed during a test period.

18. The computer program product according to claim 13 that causes the computer to initiate an update of the at least one reference sequence of block identifiers if failing, within a predefined period, to find a predefined relationship between the at least one sequence of block identifiers that are accessed during a test period and the at least one corresponding reference sequence of block identifiers.

19. The computer program product according to claim 13 that causes the computer to generate a request to re-start a system if failing, within a predefined period, to find a predefined relationship between the at least one sequence of block identifiers that are accessed during a test period and the at least one corresponding reference sequence of block identifiers.

20. The computer program product according to claim 13 that causes the computer to generate the at least one reference sequence of block identifiers.

* * * * *